United States Patent [19]

Yamakawa et al.

[11] Patent Number: 5,004,904
[45] Date of Patent: Apr. 2, 1991

[54] METHOD AND SYSTEM FOR CONTROLLING GAIN AND OFFSET IN RADIATION MEASUREMENT APPARATUS

[75] Inventors: Tsutomu Yamakawa, Tochigi; Hiroaki Kobayashi, Ootawara, both of Japan

[73] Assignee: Kabushiki Kaisha Toshiba, Kawasaki, Japan

[21] Appl. No.: 365,385

[22] Filed: Jun. 13, 1989

[30] Foreign Application Priority Data

| Jun. 17, 1988 | [JP] | Japan | 63-150913 |
| Jun. 17, 1988 | [JP] | Japan | 63-150914 |
| Aug. 19, 1988 | [JP] | Japan | 63-206081 |
| Aug. 19, 1988 | [JP] | Japan | 63-206082 |
| Aug. 31, 1988 | [JP] | Japan | 63-218920 |

[51] Int. Cl.$^5$ .................... H01J 40/14; G01T 1/20
[52] U.S. Cl. .................... 250/207; 250/369; 250/363.09
[58] Field of Search ............ 250/207, 369, 363.09, 250/213 VT, 214 AG, 361 R

[56] References Cited

U.S. PATENT DOCUMENTS

| 3,487,222 | 12/1969 | Martens | 250/207 |
| 3,714,441 | 1/1973 | Kreda | 250/207 |
| 3,864,573 | 2/1975 | Hoffman et al. | 250/369 |
| 3,900,731 | 8/1975 | Chevalier et al. | 250/207 |
| 4,047,034 | 9/1977 | Auphan | 250/363.09 |
| 4,071,762 | 1/1978 | Lange et al. | 250/369 |
| 4,079,257 | 3/1978 | Jatteau et al. | 250/363.09 |
| 4,279,510 | 7/1981 | Brown | 250/207 |
| 4,310,243 | 1/1982 | Brown et al. | 250/207 |
| 4,413,183 | 11/1983 | Metal et al. | 250/369 |
| 4,466,075 | 8/1984 | Groch et al. | 250/369 |
| 4,764,678 | 8/1988 | Yamakawa | 250/369 |

Primary Examiner—David C. Nelms
Assistant Examiner—Michael Messinger
Attorney, Agent, or Firm—Finnegan, Henderson, Farabow, Garrett, and Dunner

[57] ABSTRACT

A measurement of standard light is performed during radiation measurement for gain correction and offset correction of radiation measurement apparatus. The standard light emitted by a LED falls on a PMT. An output signal of a preamplifier corresponding to the PMT is entered into a system controller after being subjected to predetermined analog signal processing. The system controller calculates a gain correction value and an offset correction value on the basis of initial correction values and an output value of the preamplifier, whereby gain control and offset control can be performed stably even in radiation measurement.

8 Claims, 11 Drawing Sheets

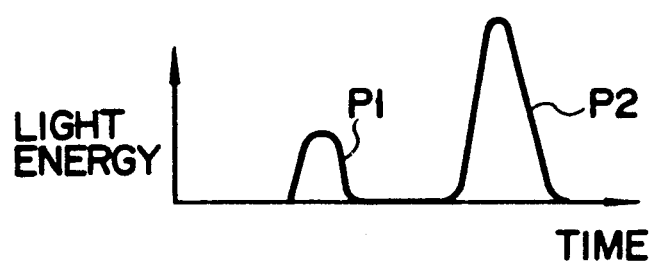
F I G. 4
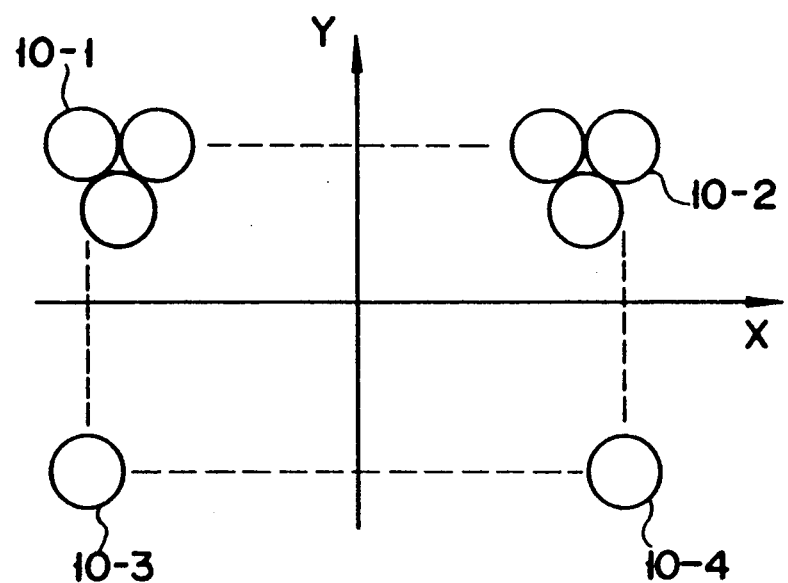
F I G. 5

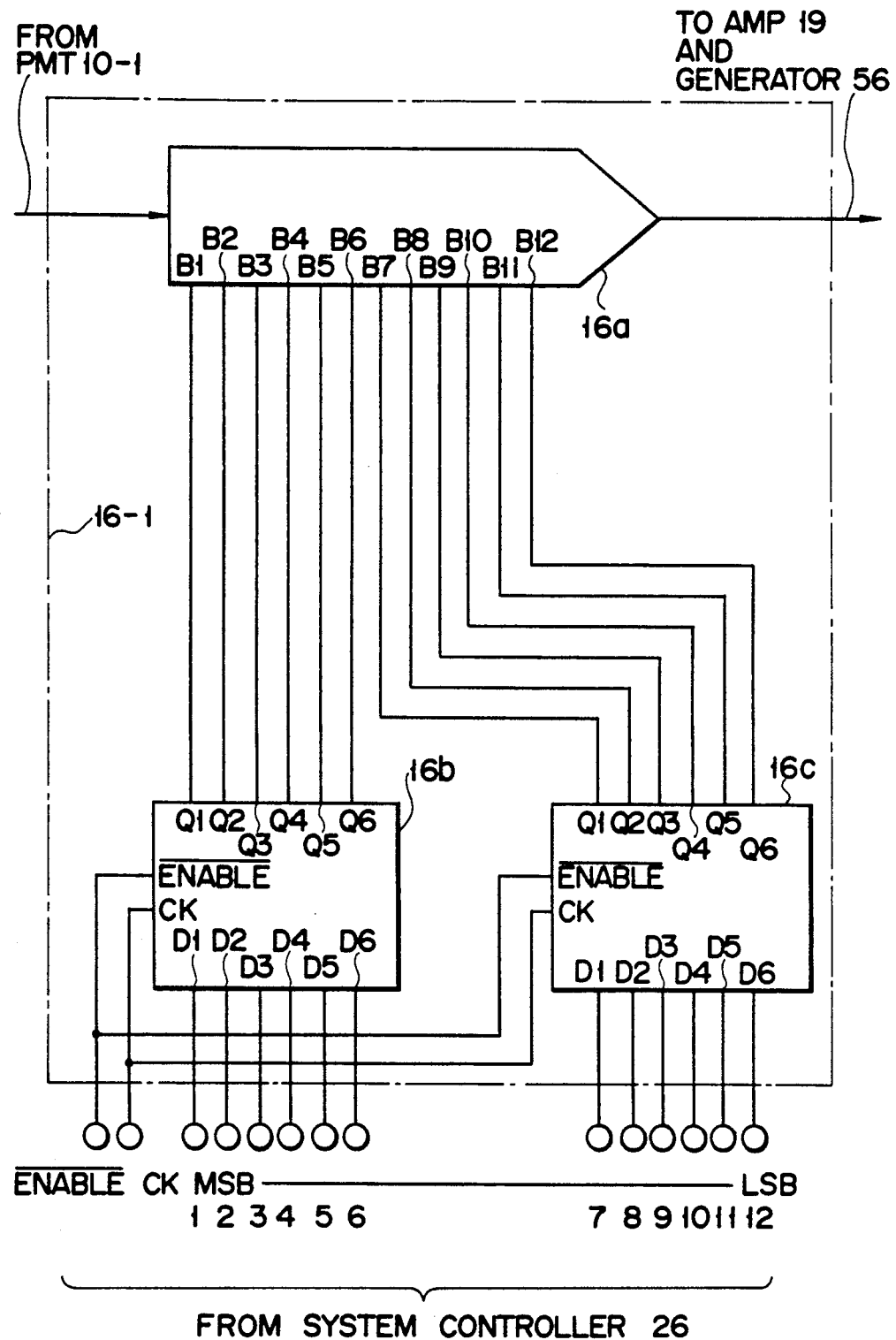
F I G. 6

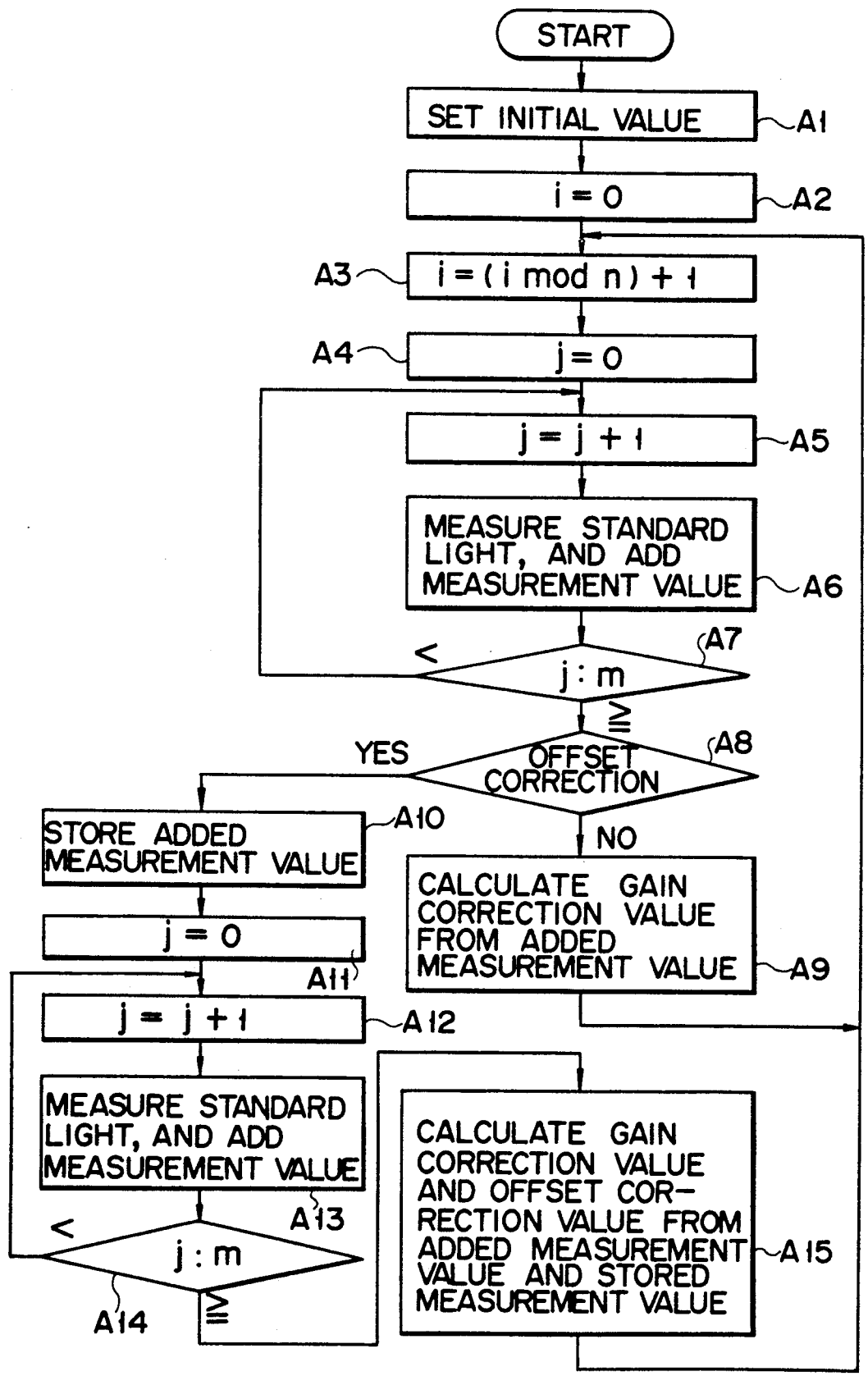
F I G. 8

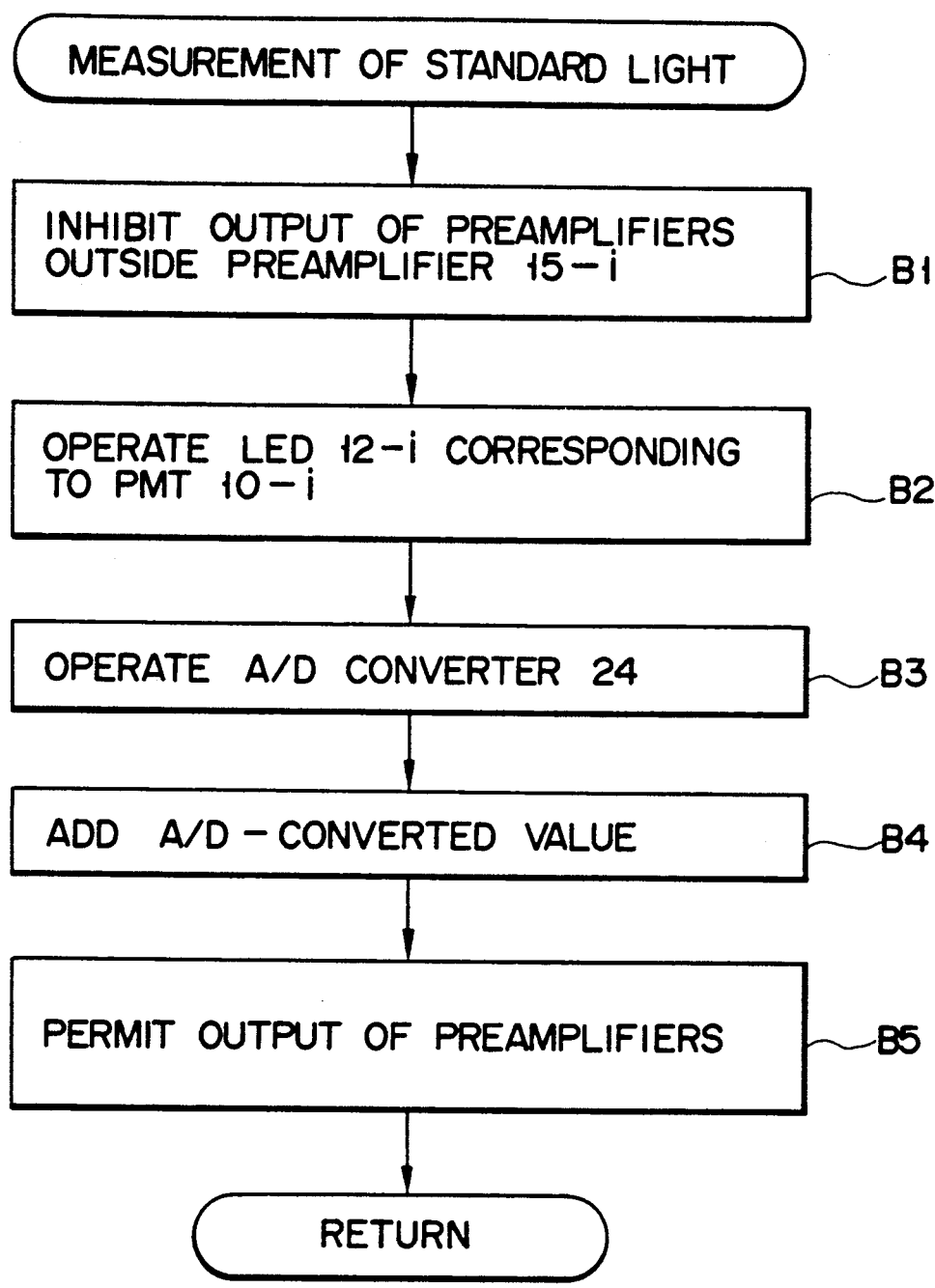
F I G. 9

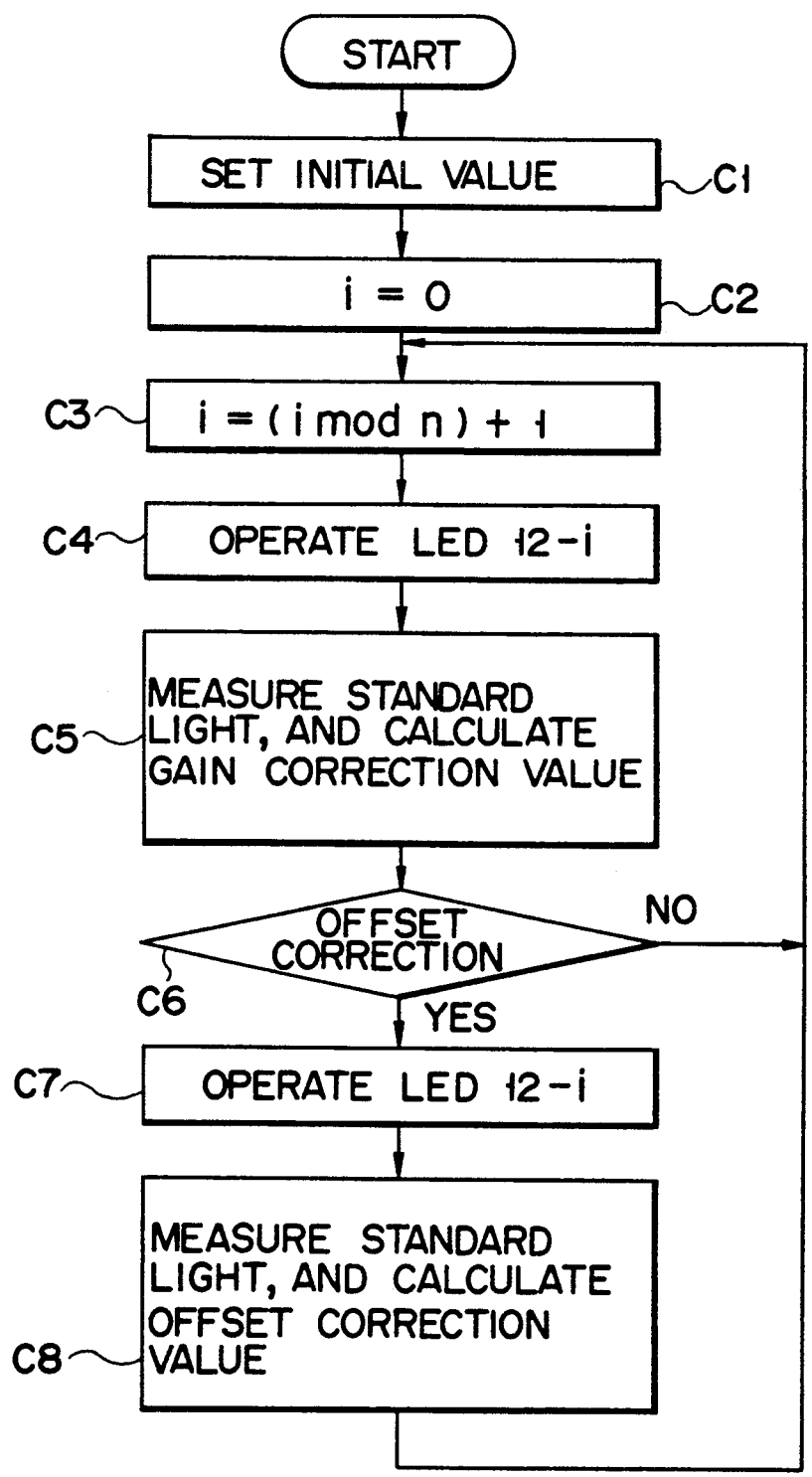
F I G. 11

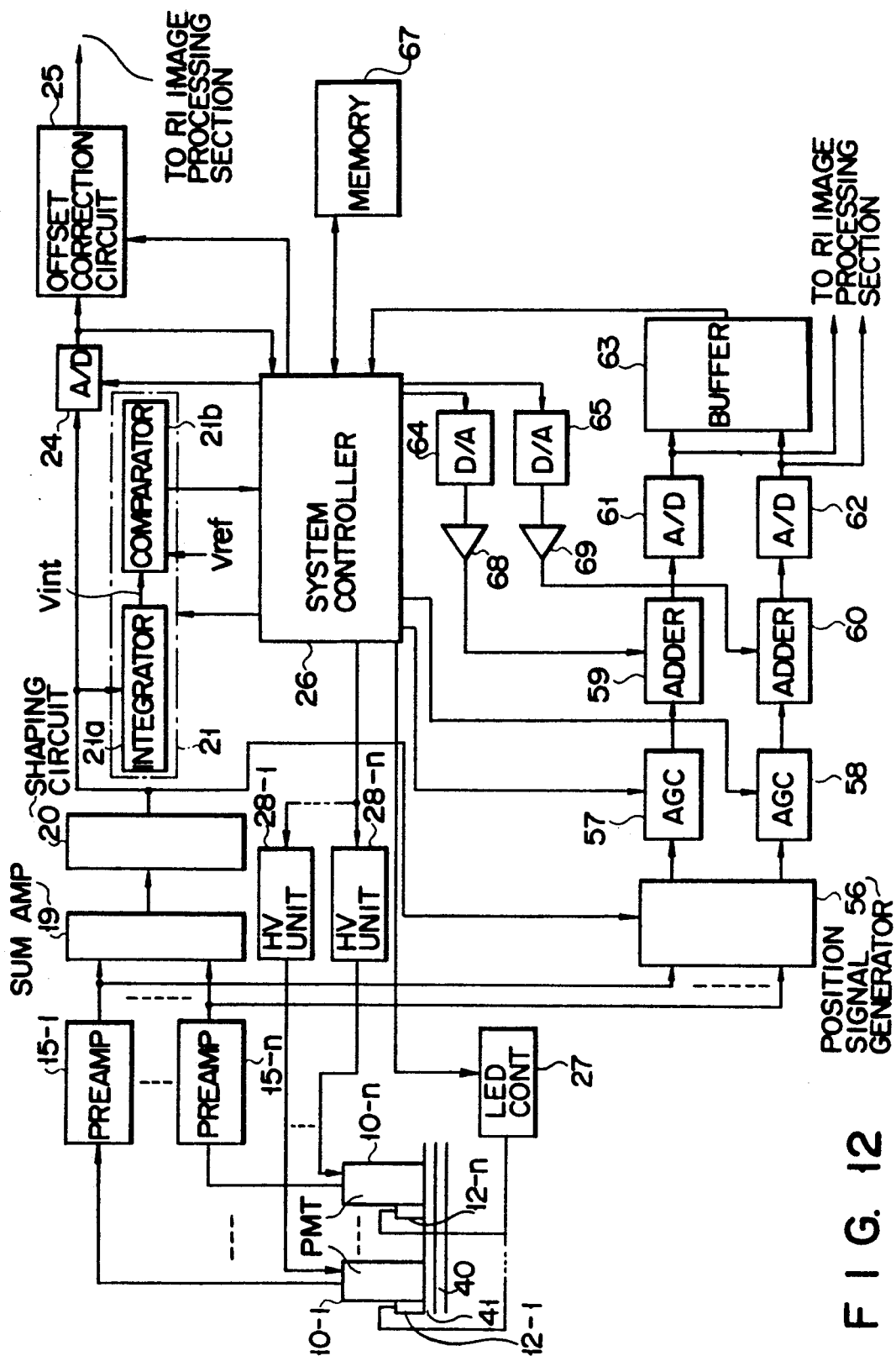
F I G. 12

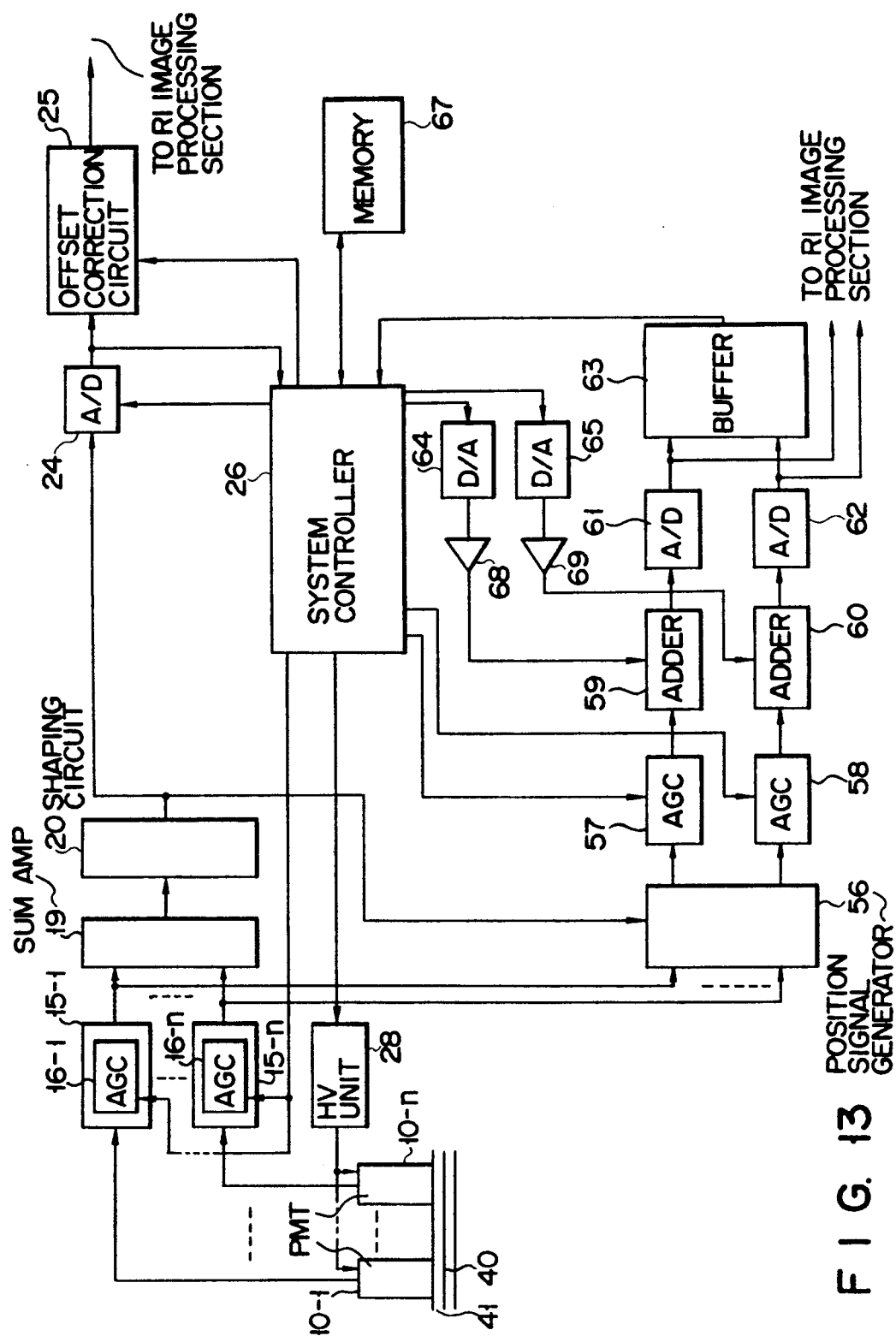
F I G. 13

METHOD AND SYSTEM FOR CONTROLLING GAIN AND OFFSET IN RADIATION MEASUREMENT APPARATUS

BACKGROUND OF THE INVENTION

1. Field of the Invention

The present invention relates to a method and system for controlling the gain and offset in radiation measurement apparatus.

2. Description of the Related Art

With radiation measurement apparatus having a scintillator responsive to incidence of radiation to produce scintillations and a photomultiplier (PMT) that converts the produced scintillations to electrical signals, stable radiation measurement, for example, gain control of the PMT is very important in improving the accuracy of radiation measurement.

However, with conventional radiation measurement apparatus, since the gain control is performed manually, it is not easy to control the PMT gain with high accuracy.

A method of controlling the gain of the PMT can be devised in which the PMT is irradiated with standard light produced by a light emitting diode (LED) and the output of the PMT is fed back to the LED. In this case, it is desirable to measure the standard light a plurality of times during radiation measurement. However, when the standard light is measured during radiation measurement, the radiation will also be detected at the same time. That is, when the radiation falls on the scintillator during emission of the standard light, scintillations produced by the scintillator will be detected by the PMT together with the standard light. As a result, the stable gain control of the PMT cannot be attained, lowering the accuracy of the radiation measurement.

Here, by way of example, a method can be devised in which the scintillations may be neglected by irradiating the PMT with standard light having a high energy level as compared with the scintillations. However, measurement conditions for the standard light and those for the scintillations are different from each other. This makes the proper gain control for the PMT impossible.

In view of the above, a device is desired which can perform the stable gain control in radiation measurement apparatus.

SUMMARY OF THE INVENTION

It is accordingly an object of the present invention to provide a method and system for controlling the gain and offset in radiation measurement apparatus.

According to one aspect of the present invention, there is provided a system for controlling a gain and offset in a radiation measurement apparatus, the system comprising:

generating means for generating a standard light;

converting means for converting a light into an electric signal;

monitoring means for monitoring the converted electric signal, and detecting a voltage value of the monitored electric signal when the monitored electric signal includes an electric signal corresponding to the standard light; and controlling means for controlling the gain and the offset in the radiation measurement apparatus by obtaining a gain correction value and an offset correction value in accordance with the detected voltage value and an initial voltage value.

According to another aspect of the present invention, there is provided a method for controlling a gain and offset in a radiation measurement apparatus, the method comprising the steps of:

generating a standard light;

converting a light into an electric signal;

monitoring the converted electric signal, and detecting a voltage value of the monitored electric signal when the monitored electric signal includes an electric signal corresponding to the standard light; and controlling the gain and the offset in the radiation measurement apparatus by obtaining a gain correction value and an offset correction value in accordance with the detected voltage value and an initial voltage value.

BRIEF DESCRIPTION OF THE DRAWINGS

FIG. 4 is a waveform diagram of standard light produced by a light emitting diode;

FIG. 5 illustrates a two-dimensional array of photomultipliers;

FIG. 6 shows a circuit arrangement of an AGC circuit in the present system;

FIGS. 8 and 9 are flowcharts of the gain correction and the offset correction in the first embodiment of the present invention;

FIG. 11 is a flowchart of a second gain correction and offset correction in the first embodiment of the present invention;

FIG. 12 is a block diagram of a second embodiment of the present invention;

FIG. 13 is a block diagram of a third embodiment of the present invention;

DETAILED DESCRIPTION OF THE PREFERRED EMBODIMENTS

Figure 1:
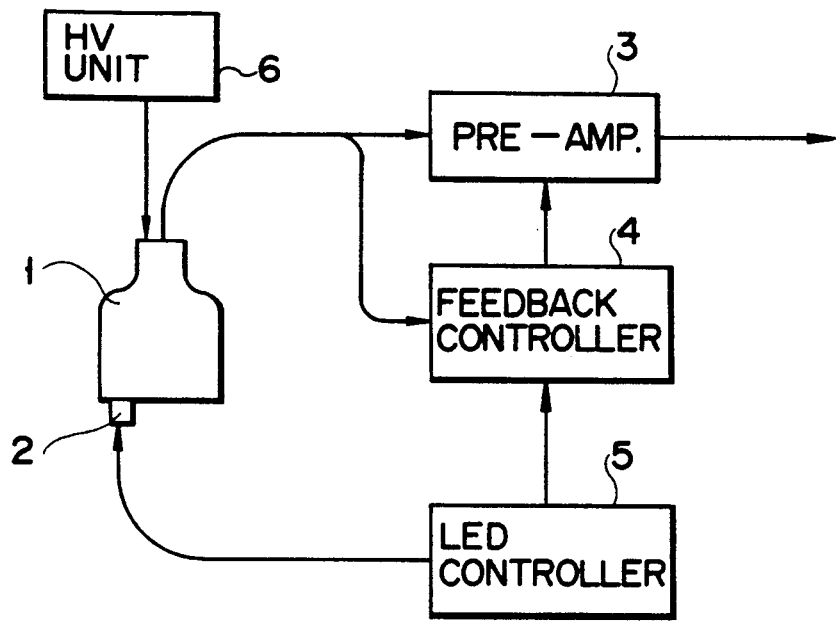
FIGS. 1 and 2 are schematic block diagrams of gain control systems in conventional radiation measurement apparatus.
Figure 2:
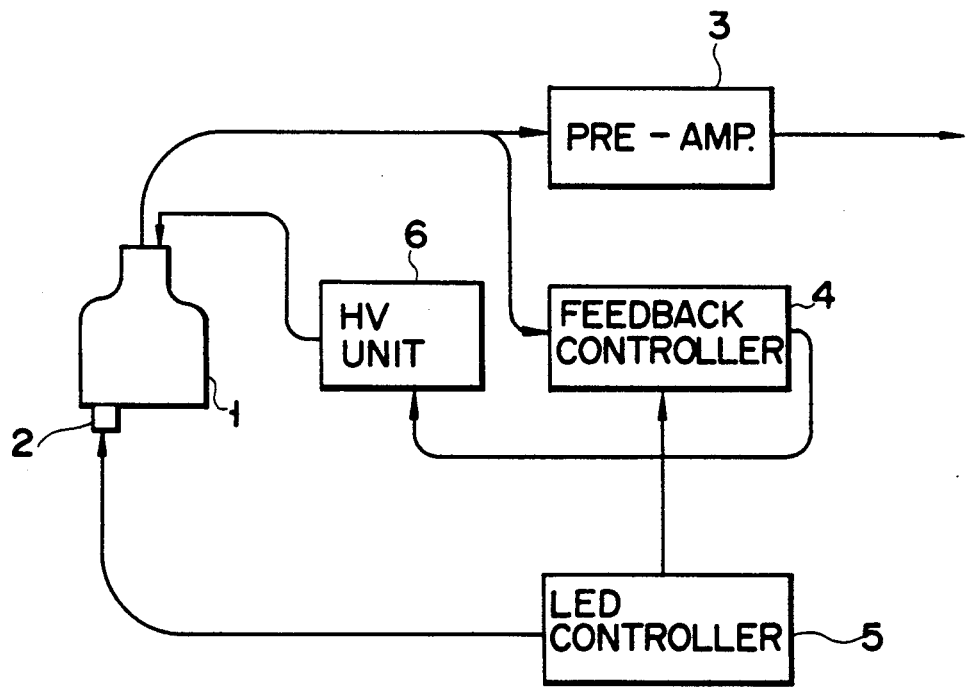

In the conventional PMT gain control systems in radiation measurement apparatus, as shown in FIGS. 1 and 2, a PMT 1 is irradiated with standard light produced by a light emitting diode (LED) 2 under the control of a LED controller 5. An output signal of PMT 1 is applied to a feedback controller 4. The feedback controller 4 controls the gain of a preamplifier 3 in accordance with the output signal of PMT 1. As a result, the gain of PMT 1 is controlled indirectly. Feedback controller 4 can control output voltage of a high voltage (HV) unit 6 so as to control the gain of PMT 1 indirectly.

Figure 3:
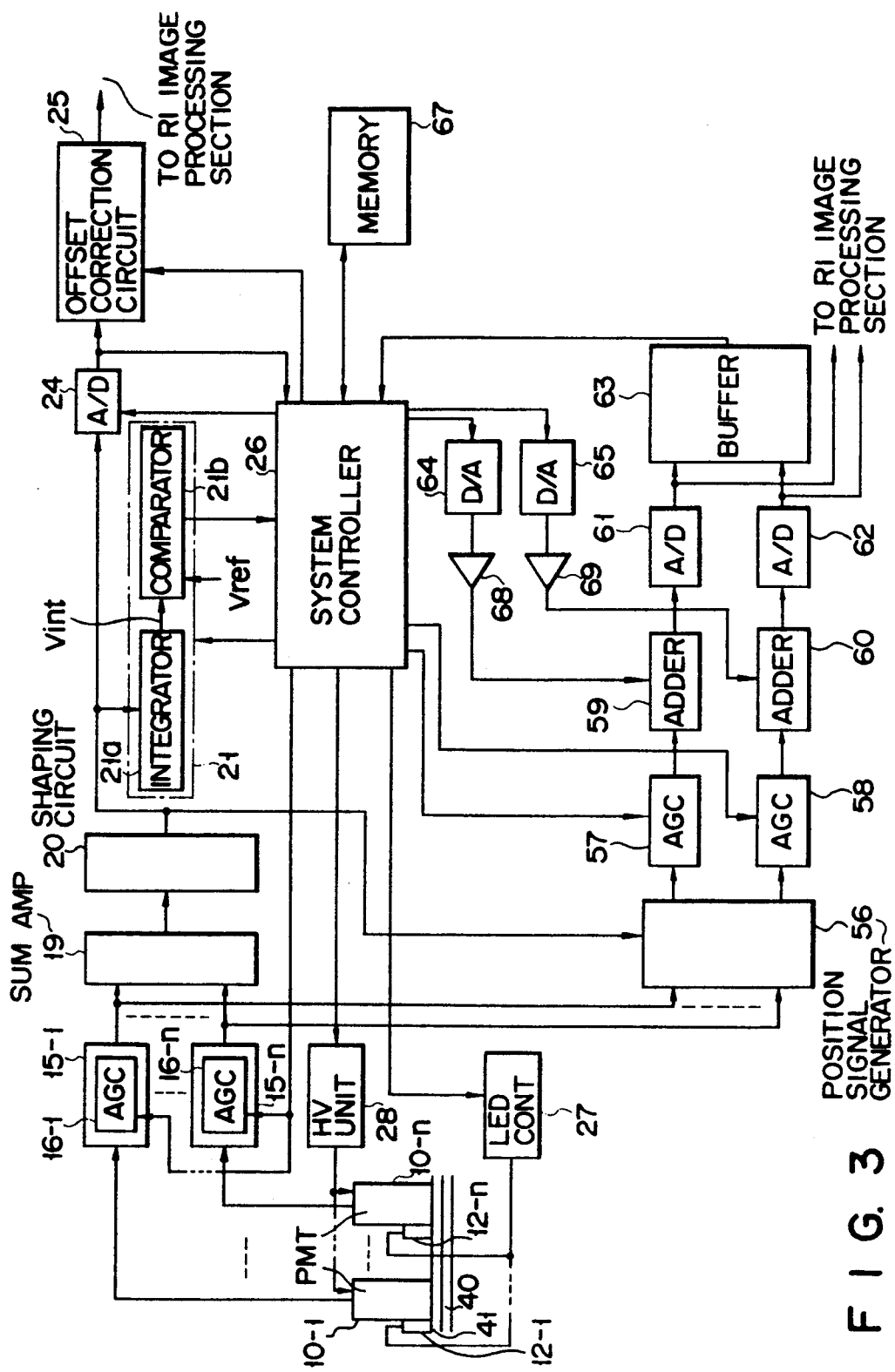
FIG. 3 is a block diagram of a radiation measurement system according to a first embodiment of the present invention.

In the measurement of the standard light during radiation measurement, such systems will detect not only the standard light but also radiation. Hence the stable control of the gain of the PMT cannot be attained Referring now to FIG. 3, there is illustrated a gain control system according to a first embodiment of the present invention.

Standard lights produced by LEDs 12-1 to 12-n are directed to PMTs 10-1 to 10-n which are driven by an HV unit 28. LEDs 12-1 to 12-n each produce two types of standard lights P1 and P2, which are different from each other in quantity of light, under the control of LED controller 27. A scintillator 40 produces scintillations in response to incidence of radiation thereto. A light guide 41 directs the produced scintillations to PMTs 10-1 to 10-n.

FIG. 5 shows a two-dimensional array (X direction, Y direction) of PMTs 10-1 to 10-n. LEDs 12-1 to 12-n are placed near PMTs 10-1 to 10-n, respectively. Alternatively, for example, LEDs 12-1 to 12-4 may be placed near PMTs 10-1 to 10-4 that are located at the four corners of the PMT array comprised of PMTs 10-1 to 10-n. LEDs 12-1 to 12-n produce light of a spectrum that is close to the optical spectrum of scintillator 40, for example, green light, as standard light. LEDs 12-1 to 12-n are driven by current pulses having predetermined duty ratio from LED controller 27.

Preamplifiers 15-1 to 15-n are associated with PMTs 10-1 to 10-n and have automatic gain control (AGC) circuits 16-1 to 16-n, respectively. The gains of preamplifiers 15-1 to 15-n are controlled by system controller 26 comprised of, for example, a central processing unit (CPU). Output signals of preamplifiers 15-1 to 15-n are applied to a shaping circuit 20 via a summing amplifier 19.

As shown in FIG. 6, AGC circuit 16-1 comprises a multiplication type D/A converter 16a and latch circuits 16b and 16c. AGC circuits 16-2 to 16-n and AGC circuits 57 and 58 to be described later are the same configuration as AGC circuit 16-1.

Terminals B1 to B12 of multiplication type D/A converter 16a are connected to terminals Q1 to Q6 of latch circuits 16b and 16c. Each of latch circuits 16b and 16c is responsive to a CK signal applied to its CK terminal to hold a 12-bit digital signal, that is, a gain correction signal, which will be described later, applied to its terminals D1 to D6 from system controller 26. The digital signal is outputted to multiplication type D/A converter 16a.

A/D converter 24 converts an analog signal outputted from shaping circuit 20 to a digital signal, and applies the digital signal to an offset correction circuit 25. Offset correction circuit 25 corrects the offset of the digital signal, i.e., measured data for radiation in accordance with an offset correction value.

A method of calculating the offset correction value will be described at this point.

Figure 7:
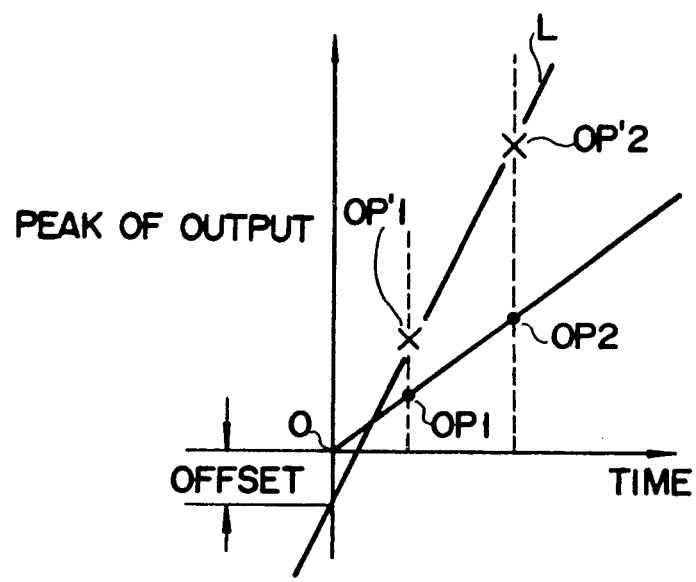
FIG. 7 is a diagram explaining offset detection.

When standard lights P1 and P2 fall on PMT 10-1 to 10-n at different points of time, peak values of corresponding output signals of A/D converter 24 in case where no offset occurs are assumed to be OP1 and OP2, respectively, in the graph of FIG. 7. It is assumed here that the peak values for standard lights P1 and P2 are adjusted such that a straight line connecting OP1 and OP2 together passes through the origin O. When PMTs 10-1 to 10-n are irradiated with standard lights P1 and P2 again after the lapse of a predetermined time, if the output peak values of A/D converter 24 were shifted to OP1' and OP2', then a straight line L connecting OP1' and OP2' would not pass through the origin O. The deviation of straight line L with respect to the origin O corresponds to the quantity of offset. The offset correction value is used for correcting the deviation.

System controller 26 calculates a gain correction value in accordance with an output signal of A/D converter 24 obtained when PMTs 10-1 to 10-n are irradiated with the standard light. The gains of preamplifiers 15-1 to 15-n are controlled in accordance with the gain correction value so that the gains of PMTs 10-1 to 10-n are controlled indirectly. System controller 26 calculates also the above offset correction value. The PMTs generally have statistical fluctuations. Thus, several measurements of the standard light and calculation of an arithmetic mean of measured data will allow the gain correction value and the offset correction value to be improved in accuracy. It is to be noted that the measurement of the standard light is performed during radiation measurement under the control of system controller 26.

Superimposed-light detector 21 detects incidence of scintillations to PMTs 10-1 to 10-n during measurement of the standard light. The detection of scintillations is performed by monitoring output signals of shaping circuit 20. Superimposed light detector 21 is composed of an integrator 21a for integrating an output signal of shaping circuit 20 until a predetermined period of time lapses from the emission of the standard light and a comparator 21b for comparing an output voltage Vint of integrator 21a with a reference voltage Vref. When Vint > Vref in comparator 21b, that is, when the standard light and the scintillations fall on PMTs 10-1 to 10-n simultaneously within a predetermined time period, superimposed light detector 21 outputs an inhibit signal to system controller 26. Upon receipt of the inhibit signal system controller 26 inhibits the operation of A/D converter 24. In other words, when the standard light and the scintillations fall on PMTs 10-1 to 10-n, the output signal of A/D converter 24 is not utilized for the offset and gain correction.

On the other hand, output signals of PMTs 10-1 to 10-n, amplified in preamplifiers 15-1 to 15-n are applied to a position signal generator 56. Position signal generator 56 calculates a position of incidence of radiation on the PMTs on the basis of the output signals of preamplifiers 15-1 to 15-n and provides position signals representing the position of incidence to AGC circuits 57 and 58. The position signals include an X signal and a Y signal.

AGC circuits 57 and 58 correct the gains of the position signals output from position signal generator 56. The gain correction is performed by gain correction signals representing gain correction values output from system controller 26.

Adders 59 and 60, each of which may be comprised of an operational amplifier, add offset correction signals representing offset correction values to output signals of AGC circuits 57 and 58, that is, the gain-corrected position signals.

A/D converters 61 and 62 convert analog signals output from adders 59 and 60 to digital signals. Digital signals output from A/D converters 61 and 62 when the standard light is emitted are applied to system controller 26 via a buffer 63. On the other hand, radiation measured data is applied to an RI image processor (not shown) to be used for formation of an RI image.

System controller 26 is responsive to the output signal of buffer 63 to produce the gain correction signal and the offset correction signal.

The gain correction signal is used for correcting variations in gain in the X and Y directions and obtained by making a comparison between the position signal output from buffer 63 and an initial position signal which is previously set and changing a difference resulting from the comparison to a gain variation. The gain correction signal is applied to AGC circuits 57 and 59.

The offset correction signal is used for correcting variations in offset in the X and Y directions and obtained by making a comparison between the position signal output from buffer 63 and an initial position signal which is previously set and changing a difference resulting from the comparison to an offset variation. The offset correction signal output from system controller 26 is converted to analog signals by D/A converters 64 and 65 and then applied to adders 59 and 60 via buffers 68 and 69.

It is to be noted here that the initial position signal is a position signal obtained at the time of the first emission of the standard light and is stored in a memory 67.

The operation of the present system will be described hereinafter.

The radiation measurement is carried out as follows. The initial values for the gain and offset correction are previously set in AGC circuits 16-1 to 16-n and offset correction circuit 25.

When radiation from RI (Radioisotope) given to a subject under examination falls on scintillator 40, scintillations are produced by scintillator 40 and fall on PMTs 10-1 to 10-n. The output signals of the PMTs 10-1 to 10-n are amplified by preamplifiers 15-1 to 15-n and then applied to offset correction circuit 25 via summing amplifier 19, shaping circuit 20 and A/D converter 24. A signal subjected to offset correction in offset correction circuit 25 is input to the RI image processor.

On the other hand, the output signals of PMTs 10-1 to 10-n; amplified in the preamplifiers 15-1 to 15-n, are applied to position signal generator 56. Position signal generator 56 calculates the position of incidence of the radiation in accordance with the output signals of preamplifiers 15-1 to 5-n to provide position signals (X and Y signals) indicating the position of incidence. The X signal is applied to A/D converter 61 via AGC circuit 57 and adder 59, while the Y signal is applied to A/D converter 62 via AGC circuit 58 and adder 60. The output signals of A/D converters 61 and 62 are input to the RI image processor.

The above radiation measurement is continued until an RI image is formed On the other hand, the gain correction and the offset correction are carried out as follows.

System controller 26 inhibits preamplifiers except a preamplifier in use for correction from output signals and outputs an emission command signal to LED controller 27. The emission command signal includes a signal for setting a quantity of light to be emitted. LED controller 27 responds to the emission command signal to cause a predetermined LED to emit light. An output signal of a PMT irradiated with the reference light from the LED is amplified by a corresponding preamplifier and then applied to A/D converter 24 via summing amplifier 19 and shaping circuit 20. A digital signal output from A/D converter 24 is input to system controller 26. In response to application of the digital signal, system controller 26 allows the preamplifiers which have been inhibited from outputting signals to be operated. Consequently, the usual radiation measurement is performed.

System controller 26 obtains an average value of measured data for the standard lights based on the above sequence and acquires a gain variation by a comparison between the obtained average value and the initial value for the gain correction set in the preamplifiers or the previous average value. The gain variation includes gain variations of the PMTs and gain variations of analog signal processing system. System controller 26 changes gain correction values set at the preamplifiers in accordance with the obtained gain variation. Consequently, the gains of the preamplifiers vary so that the gain correction process for the predetermined preamplifier is completed.

In the present measurement system with a plurality of PMTs, the preamplifiers are subjected to the above gain correction in sequence.

The operation is performed for two types of standard lights The offset correction value is calculated from measured data for the respective types of standard lights, varying the offset correction value set in offset correction circuit 25.

In FIGS. 8 and 9, there are shown flowcharts of the gain correction and offset correction carried out by system controller 26. In the measurement system having n PMTs 10-1 to 10-n, m signals obtained from each of the PMTs in m measurements of standard light are averaged.

In step A1, initial values of the gain correction value and the offset correction value are set to AGC circuits 16-1 to 16-n and offset correction circuit 25, respectively. In step A2, a variable i is set to O. In step A3, the variable i is incremented by one. Subsequently in step A4, a variable j is set to O. The variable j is incremented by one in step A5.

In step A6, the standard light is measured and the measured values obtained from preamplifier 15-i are added together.

In step A7, it is determined as to whether $j \geq m$ or not. When $j < m$, steps A5 and A6 are carried out. That is, steps A5 and A6 are carried out repeatedly until $j \geq m$ in step A7. Here a predetermined number of add processes for measured data output from preamplifier 15-i, that is, m add processes are performed. After m add processes are completed, an average value of measured data is obtained.

In step A8, it is determined as to whether the offset correction is performed or not. If the offset correction is not performed, then a gain correction value is calculated on the basis of the initial value and the measured values in steps A9. The calculated gain correction value is set to AGC circuit 16-i.

If the offset correction is performed, a sum of the measured values is stored in step A10. In step A11, variable j is set to O, and in step A12 variable j is incremented by one. In step A13, the standard light is measured and the measured values from preamplifier 15-i are added. The measurements of the standard light in steps A13 and A6 are different from each other in quantity of light emitted by the LED. If, for example, standard light P1 shown in FIG. 4 is used in step A6, then standard light P2 is used in step A13.

In step A14, it is determined as to whether $j \geq m$ or not. When $j \geq m$ in step A14, a gain correction value and an offset correction value are calculated from the initial values, the measured data obtained in step 13 and the sum of measured data stored in step A10 (step A15). AGC circuit 16-i and offset correction circuit 25 are set with the gain correction value and the offset correction value, respectively After step A15 is completed, step A3 is carried out.

FIG. 9 is a flowchart of steps A6 and A13.

In step B1, the preamplifiers except preamplifier 15-i are inhibited from producing output signals. In step B2, LED 12-i corresponding to PMT 10-i is instructed to emit light, and subsequently, in step B3, A/D converter 24 is controlled to operate when the standard light emitted from LED 12-i falls on PMT 10-i. In step B4, an add process is carried out in accordance with digital values from A/D converter 24. In step B5, the preamplifiers that were inhibited in step B1 are enabled.

The measurement of standard light and the addition of measured data are carried out during radiation measurement. Therefore, when PMTs 10-1 to 10-n are irradiated with the standard light from LEDs 12-1 to 12-n, scintillations can be generated by radiation from RI within the subject under examination and superimposed upon the standard light for subsequent application to the PMTs 10-1 to 10-n. When superimposed light detector 21 detects the superimposed light, measured data obtained at a time of emission of standard light is not used in the gain and offset correction.

Figure 10:
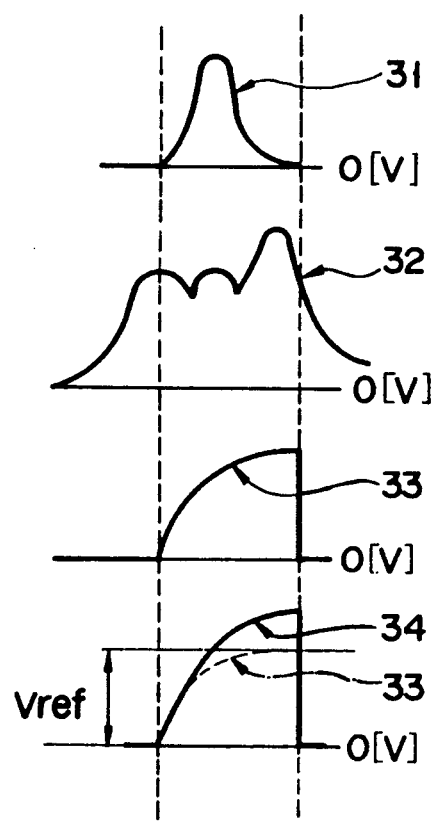
FIG. 10 are diagrams explaining detection of superimposed light.

FIG. 10 shows an output waveform of shaping circuit 20 and an output waveform of integrator 21a. Assume that a signal 31 is obtained from shaping circuit 20 when only standard light falls on PMT, while a signal 32 is obtained from shaping circuit 20 when standard light and scintillation fall on the PMT. In this case, integrator 21a integrates the output signal of shaping circuit 20 until several μs lapses from the emission of standard light to provide a voltage Vint. Where signal 31 is output from shaping circuit 20, a signal 33 is obtained from integrator 21a as voltage Vint. When signal 32 is output from shaping circuit 20, on the other hand, a signal 34 is obtained from integrator 21a as voltage Vint.

Reference voltage Vref is previously set somewhat higher than signal 33 in voltage level. When Vint>Vref, comparator 21a outputs an inhibit signal to system controller 26. When Vint<Vref, on the other hand, comparator 21a outputs no inhibit signal.

As described above, when superimposed light is detected, superimposed light detector 21 outputs an inhibit signal to system controller 26. System controller 26 is responsive to the inhibit signal to disable A/D converter 24. That is, the calculation of a correction value from measured data is inhibited, whereby errors due to superimposed light can be eliminated and proper correction of gain and offset can be attained.

Reference voltage Vref is used with comparator 21b. Alternatively, a signal output from shaping circuit 20 in the absence of superimposed light may be sampled to hold a peak value for use as Vref. In this case it is necessary that the inhibit signal is applied to system controller 26 only when an output value of shaping circuit 20 exceeds the peak value held.

In the above embodiment, the gain of the radiation measurement system is controlled by signals after analog signal processing. As shown in FIGS. 1 and 2, the gain control may be performed on the basis of a signal from PMT 1 to preamplifier 3.

The present system can measure the standard light once for each of the PMTs and calculate a gain correction value by adding the measured data to a sum of measured data obtained in the previous measurements. Moreover, the present system can measure the standard light with different quantities of light at a time and calculate an offset correction value in accordance with the measured value and a sum of measured data obtained in the previous measurements.

FIG. 11 is a flowchart of the gain and offset correction in one measurement of standard light In step C1, initial values for gain and offset correction are set. In step C2, a variable i is set to O, which is then incremented by one in step C3. LED 12-i is instructed to emit standard light in step C4, and the standard light emitted from LED 12-i is measured and a gain correction value is calculated on the measured data and the above initial values in step C5. The gain correction value is set to AGC circuit 16-i.

In step C6, it is determined as to whether the offset correction is performed or not. If the offset correction is not to be performed, then step C3 is carried out.

If the offset correction is to be performed, then LED 12-i is instructed to emit light in step C7. In this case, the quantity of light to be emitted is different from that in step C4. In step C8, the standard light emitted from LED 12-i is measured and the offset correction value is calculated from the measured data and the initial value. The offset correction value is set to offset correction circuit 25. After step C8 is completed, step C3 is carried out.

In this way, the correction process can be performed faster than the above process in FIG. 8.

On the other hand, the gain correction and offset correction for position signals are carried out as follows.

The acquisition of initial position signals will first be explained.

LEDs 12-1 to 12-n emit standard light periodically at different points of time for application to PMTs 10-1 to 10-n. Signals output from preamplifiers 15-1 to 15-n in response to incidence of the standard light to PMTs 10-1 to 10 n are applied to position signal generator 56. In this case, preamplifiers except a preamplifier corresponding to a PMT being irradiated with standard light are not enabled.

Position signal generator 56 generates position signals (X and Y signals) at generation of the standard light in accordance with signals output from preamplifiers 15-1 to 15-n. The X signal and the Y signal are applied to system controller 26 via AGC circuits 57 and 58, adders 59 and 60, A/D converters 61 and 62 and buffer 63. System controller 26 stores the X and Y signals in memory 67. These X and Y signals serve as initial position signals.

Next, the gain correction and the offset correction based on the initial position signals will be described.

In the case with the above described acquisition of the initial position signals, PMTs 10-1 to 10-n are irradiated with standard light at different points of time during radiation measurement. An output signal of a preamplifier corresponding to a PMT receiving the standard light is applied to position signal generator 56. Position signals generated by position signal generator 56 are applied to system controller 26 via AGC circuits 57 and 58, adders 59 and 60, A/D converters 61 and 62 and buffer 63. System controller 26 compares these position signals with the initial position signals stored in memory 67 to calculate their level differences. The gain correction signal and the offset correction signal are acquired on the basis of the level differences.

The gain correction signal is applied to AGC circuits 57 and 58, whereby the gain correction of the position signals during radiation measurement is carried out by AGC circuits 57 and 58.

The offset correction signal is applied to adders 59 and 60 via D/A converters 64 and 65, buffers 68 and 69, whereby the offset correction of the position signals are carried out in adders 59 and 60.

FIG. 12 is a bock diagram of a second embodiment of the present invention. HV units 28-1 to 28-n correspond to PMTs 10-1 to 10-n. The gain correction is carried out by feedback of PMT drive voltages from HV units 28-1 to 28-n. That is, gain correction values calculated by system controller 26 are set to HV units 28-1 to 28-n. HV units 28-1 to 28-n apply predetermined drive voltages to PMTs 10-1 to 10-n in accordance with the gain correction values. The system of FIG. 3 controls the gains of the preamplifiers, while the system of FIG. 13 controls the drive voltages of the PMTs.

Since the above gain correction and the offset correction are carried out periodically during radiation measurement, the uniformity of an RI image can be improved. Although, in the conventional system, the gain correction and offset correction are carried out manually at a time of shipment of apparatus, the present system permits periodical automatic correction during radiation measurement, thus eliminating the need for correction at a time of shipment of apparatus.

The number and locations of the PMTs irradiated with standard light may be set arbitrarily. The more the number of PMTs irradiated with standard light, the higher the measurement accuracy.

FIG. 13 is a block diagram of a third embodiment of the present invention. The third embodiment has no LEDs and superimposed light detector.

Figure 14:
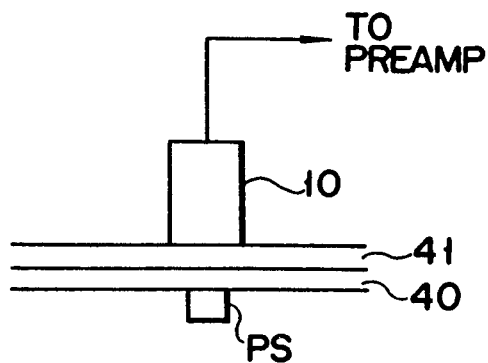
FIGS. 14 and 15 are a front view and a plan view illustrating the location of a point source for a photomultiplier.
Figure 15:
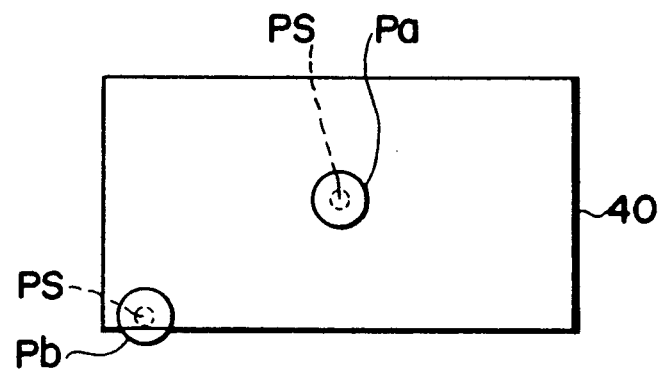

As shown in FIGS. 14 and 15, PMT 10, which is disposed over scintillator 40 with light guide 41 interposed therebetween, will provide a difference output level between position Pa and position Pb with a point source PS of $^{57}$Co housed in a lead pot at restricting to the center of PMT 10. This is due mainly to the edge effect of scintillator 40. Adjustments are then made such that the preamplifiers have the same output level for respective positions of PMTs disposed over scintillator 40 with their respective point sources PS restricted. That is, the gains of PMTs themselves is controlled by potentiometers used for adjustment of applied voltages to the PMTs.

After the adjustments of the PMTs are performed and they are arranged in a two-dimensional array, such gain corrections as above are carried out.

Figure 16:
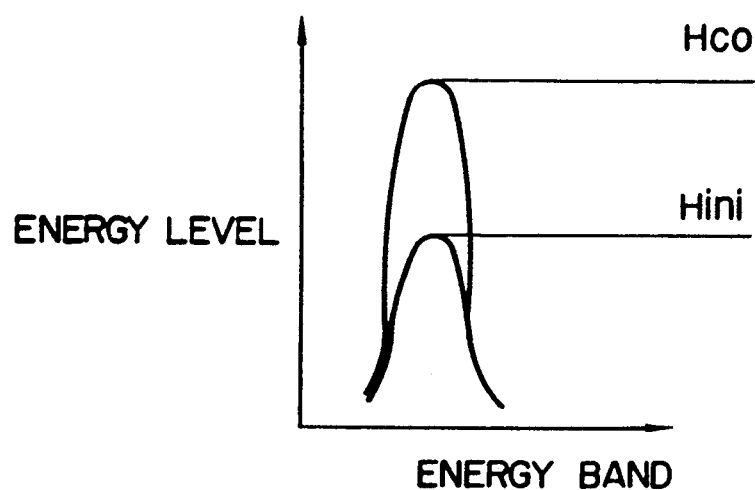
FIG. 16 show a variation in energy levels of a signal due to a variation in gain in the systems of the present invention.

When the output level of a preamplifier is different from the reference level as shown in FIG. 16, a gain correction value Dco is obtained as follows:

$$Dco = Dini \cdot (Hini/Hco)$$

where Hco is a peak value of output signal of a preamplifier which is obtained when point source PS is restricted to the center of PMT Hini is a peak value of the reference signal and Dini is an initial value of the gain correction value previously set to multiplication type D/A converter 16a.

The gains of the preamplifiers can be controlled on the basis of the gain correction value obtained by the above formula.

In this way the gain adjustment of PMTs for their respective positions can be performed previously and moreover, if the gain adjustment is poor, more accurate gain adjustment can be made by using the gain correction value.

Although specific embodiments of the present invention have been disclosed and described, it is apparent to those skilled in the art that other embodiments and modification are possible.

What is claimed is:

1. A system for controlling gain and offset in a radiation measurement apparatus during radiation measurement, the system comprising:

generating means for generating at least one first standard light signal during a first period and generating at least one second standard light signal during a second period, the amplitude of said first standard light signal being different from the amplitude of said second standard light signal;

photoelectric means, positioned to receive light from said generating means and to receive light indicative of said radiation measurement, for converting light into measurement light signals;

detecting means, responsive to said photoelectric means, for detecting at least one first measurement light signal during said first period from light including said at least one first standard light signal, and detecting at least one second measurement light signal during said second period from light including said at least one second standard light signal;

determining means, responsive to said detecting means, for determining whether or not said detected first and second measurement light signals each include a radiation light signal representing radiation measurement;

obtaining means, responsive to said detecting means and determining means, for obtaining from said first and second measurement light signals first and second correction values when said first and second measurement light signals are determined to not include any radiation light signal representing radiation measurement, said first and second correction values each corresponding respectively to said first and second standard light signals; and controlling means, responsive to said obtaining means, for controlling the gain in accordance with said first correction value and controlling the offset in accordance with said first and second correction values.

2. The system according to claim 1, wherein the determining means includes:

integrating means for integrating said first and second measurement light signals during a desired integrating period to produce a resultant integrated signal; and comparing means for comparing said resultant integrated signal with a reference signal.

3. The system according to claim 2, wherein said means for obtaining is inhibited when said resultant integrated signal exceeds said reference signal.

4. The system according to claim 1, wherein said generating means includes at least one light emitting diode.

5. The system according to claim 1, wherein said photoelectric means includes a plurality of photomultipliers.

6. A method of controlling gain and offset in a radiation measurement apparatus during radiation measurement, the method comprising the steps of:

generating at least one first standard light signal during a first period and generating at least one second standard light signal during a second period, the amplitude of said first standard light signal being different from the amplitude of said second standard light signal;

converting light from said generating means and light indicative of said radiation measurement into measurement light signals;

detecting at least one first measurement light signal during said first period from light including said at least one first standard light signal, and detecting at least one second measurement light signal during said second period from light including said at least one second standard light signal;

determining whether or not said detected first and second measurement light signals each include a radiation light signal representing radiation measurement;

obtaining from said first and second measurement light signals first and second correction values when said first and second measurement light signals are determined to not include any radiation light signal representing radiation measurement, said first and second correction values each corresponding respectively to said first and second standard light signals; and controlling the gain in accordance with said first correction value and controlling the offset in accordance with said first and second correction values.

7. The method according to the claim 6, wherein the determining step includes the steps of:

integrating said first and second measurement light signal during a desired integrating period to produce a resultant integrated signal; and comparing said integrated signal with a reference signal.

8. The method according to claim 7, wherein the said obtaining step includes the step of inhibiting obtaining said first and second correction values when said resultant integrated signal exceeds said reference signal.

* * * * *